United States Patent
Cerea et al.

(10) Patent No.: US 11,292,719 B2
(45) Date of Patent: Apr. 5, 2022

(54) PLANT FOR THE PRODUCTION OF NITRIC ACID, A RELATED PROCESS AND METHOD OF REVAMPING

(71) Applicant: Casale SA, Lugano (CH)

(72) Inventors: Iacopo Cerea, Lugano (CH); Jean François Granger, Angoulins (FR)

(73) Assignee: Casale SA, Lugano (CH)

(*) Notice: Subject to any disclaimer, the term of this patent is extended or adjusted under 35 U.S.C. 154(b) by 35 days.

(21) Appl. No.: 16/491,965

(22) PCT Filed: Feb. 1, 2018

(86) PCT No.: PCT/EP2018/052469
§ 371 (c)(1),
(2) Date: Sep. 6, 2019

(87) PCT Pub. No.: WO2018/162150
PCT Pub. Date: Sep. 13, 2018

(65) Prior Publication Data
US 2020/0071167 A1    Mar. 5, 2020

(30) Foreign Application Priority Data
Mar. 7, 2017  (EP) ..................... 17159734

(51) Int. Cl.
*C01B 21/46* (2006.01)
*B01D 53/14* (2006.01)
(Continued)

(52) U.S. Cl.
CPC .......... *C01B 21/46* (2013.01); *B01D 53/1493* (2013.01); *B01D 53/56* (2013.01);
(Continued)

(58) Field of Classification Search
CPC ......... C01B 21/46; C01B 21/28; C01B 21/26; B01D 53/1493; B01D 53/56; B01D 53/78;
(Continued)

(56) References Cited

U.S. PATENT DOCUMENTS

| 3,881,004 A | 4/1975 | Kelly et al. |
| 6,264,910 B1 | 7/2001 | Maurer et al. |
| 2016/0039674 A1 | 2/2016 | Schwefer et al. |

FOREIGN PATENT DOCUMENTS

DE    100 11 335 A1    9/2001

OTHER PUBLICATIONS

International Search Report issued in connection with PCT/EP2018/052469.
(Continued)

*Primary Examiner* — Anthony J Zimmer
(74) *Attorney, Agent, or Firm* — Akerman LLP

(57) ABSTRACT

A dual-pressure plant for the synthesis of nitric acid comprising: a reactor (4) providing a gaseous effluent (15) containing nitrogen oxides; an absorption tower (6) nitrogen oxides react with water providing raw nitric acid and, said absorption tower operating at a pressure greater than the pressure of the reactor; a compressor (5) elevating the pressure of the reactor effluent (15) to the absorption pressure; said plant also comprising a first bleacher (37) and a second bleacher (7), said first bleacher (37) stripping with air (39) nitrogen oxides from the output stream (27) of the absorption tower (6) providing a partially stripped nitric acid stream (40) and a nitrogen oxides-loaded air stream (41), the former being fed to the second bleacher (7) and the latter being recycled to the delivery-side of said compressor (5).

5 Claims, 2 Drawing Sheets

(51) Int. Cl.
  *B01D 53/56* (2006.01)
  *B01D 53/78* (2006.01)
  *C01B 21/28* (2006.01)
(52) U.S. Cl.
  CPC .............. *B01D 53/78* (2013.01); *C01B 21/28* (2013.01); *B01D 2252/103* (2013.01); *B01J 2219/00024* (2013.01)
(58) Field of Classification Search
  CPC .............. B01D 2252/103; B01D 53/02; B01J 2219/00024
  See application file for complete search history.

(56) References Cited

OTHER PUBLICATIONS

International Preliminary Report on Patentability issued in connection with PCT/EP2018/052469.

PLANT FOR THE PRODUCTION OF NITRIC ACID, A RELATED PROCESS AND METHOD OF REVAMPING

This application is a national phase of PCT/EP2018/052469, filed Feb. 1, 2018, and claims priority to EP 17159734.7, filed Mar. 7, 2017, the entire contents of both of which are hereby incorporated by reference.

FIELD OF THE INVENTION

The invention relates to the field of industrial production of nitric acid. In particular, the invention relates to a dual-pressure plant for the production of nitric acid, a related process and method of revamping.

PRIOR ART

The production of nitric acid starting from ammonia and air basically involves: a first step of oxidation of ammonia with air, over a suitable catalyst, obtaining a gaseous product mainly containing $NO_x$; a second step of contacting said gaseous product with water to absorb the above mentioned oxides, thus obtaining nitric acid and a tail gas mainly containing nitrogen, oxygen and residual nitrous oxides. The step of oxidation is also termed combustion.

The processes for the synthesis of nitric acid can be differentiated into mono-pressure (single-pressure) and dual-pressure (split-pressure).

In mono-pressure processes, ammonia oxidation and absorption take place at the same working pressure. They generally include medium-pressure (2-6 bar) and high-pressure (7-11 bar) processes.

In dual-pressure processes, the absorption pressure is higher than the oxidation pressure. Modern dual-pressure processes feature a low-pressure (LP) combustion operating at 2-6 bar and high-pressure (HP) absorption operating at 9-16 bar.

A dual-pressure process requires an air compressor to feed air to the combustion step and a nitrous gas compressor to feed the absorption step.

The drive power for the air compressor and the nitrous gas compressor generally come from a tail-gas turbine and a steam turbine or electric motor.

Accordingly, the compressor train of a plant generally comprises of an air compressor, a nitrous gas compressor, a tail-gas turbine, and a steam turbine.

More in detail, a dual-pressure process works as follows.

Ammonia is mixed with air and the resulting mixture is oxidized in a reactor over a catalyst, thus obtaining a LP nitrous gas mixture. The term "mixture" denotes a gaseous stream containing $NO_x$ and $N_2O$. At the outlet of the reactor, the heat content of said mixture is recovered to heat the tail gas and to produce steam.

After a condensing step, weak acid is formed and pumped to an absorption tower. After separation from the acid, the LP nitrous gas is sent to the nitrous gas compressor wherein its pressure is elevated to the absorption pressure, obtaining a HP nitrous gas which is sent to an absorption tower. Inside said tower, the HP nitrous gas reacts with water to produce a stream of raw nitric acid also containing residual nitrous gas. Said nitrous gas are then stripped out with air inside a low-pressure (LP) bleacher; said bleacher is generally operated at about the same pressure as the ammonia oxidation reactor. The stripped nitrous gas are recycled to the suction-side of the nitrous gas compressor. The nitric acid from the bleacher is then sent to plant battery limits, usually to storage.

The air used for the oxidation of ammonia is commonly denoted as primary air; the air used as stripping medium in the bleacher is commonly denoted as secondary air.

According to the known art, the revamping of said nitric acid plants is commonly based on increasing the amount of primary air to the reactor, which leads to a proportional increase of the amount of nitric acid produced.

The increase of the amount of primary air in the reactor entails the installation of a new air compressor or the revamping of the existing one. The increase of the primary air also causes a higher amount of gas to be processed into the subsequent nitrous gas compressor, thus entailing the further revamping of the nitrous gas compressor or the installation of a new one, and the modification or replacement of the tail-gas and/or the steam-turbines. Otherwise, the nitrous gas compressor would easily achieve its process limit becoming the bottleneck of the plant.

However, said revamping has significant drawbacks. First of all, it entails elevated costs for the modification or replacement of the existing machines, i.e. the air compressor, the nitrous gas compressor and the corresponding turbines. In addition, the revamping of said machines is also technically demanding leading to long plant downtime.

SUMMARY OF THE INVENTION

The aim of the invention is to solve the above drawbacks of the prior art.

The aim is reached with a dual-pressure plant for the synthesis of nitric acid according to claim 1.

Said dual-pressure plant comprises:

a reactor, wherein a stream of ammonia is oxidized to provide a gaseous effluent containing nitrogen oxides;

an absorption tower, wherein nitrogen oxides contained in said gaseous effluent react with water to provide an output product stream containing nitric acid and nitrogen oxides and a tail gas, said reactor operating at a reaction pressure and said absorption tower operating at an absorption pressure greater than the reaction pressure;

a compressor, which elevates the pressure of the gaseous effluent of the reactor from the reaction pressure to the absorption pressure;

said plant being characterized by comprising at least a first bleacher and a second bleacher, said first bleacher stripping nitrogen oxides away from the output stream of the absorption tower with a first stripping medium, providing a partially stripped nitric acid stream and a nitrogen oxides-loaded stripping medium, said partially stripped nitric acid stream being fed to the second bleacher, said second bleacher stripping nitrogen oxides away from said partially stripped nitric acid stream with a second stripping medium, providing a stream of bleached nitric acid, said nitrogen oxides-loaded stripping medium from the first bleacher being recycled to the discharge-side of said compressor.

Said first and second stripping medium are preferably air or oxygen-enriched air.

For the sake of clarity, said reactor will be also referred to as "ammonia oxidation reactor" and said compressor will be also referred to as "nitrous gas compressor".

The term of nitrogen oxides denotes the following: nitrogen monoxide (NO), nitrogen dioxide ($NO_2$), dinitrogen tetroxide ($N_2O_4$) and dinitrogen monoxides ($N_2O$).

Preferably, said reaction pressure ranges between 2 and 6 bar, and said absorption pressure ranges between 9 and 16 bar.

The first bleacher receives the product effluent of the absorption tower. This product effluent is typically withdrawn from the bottom of the absorption tower and contains some nitric acid. A tail gas is also extracted from the absorption tower, typically from the top of the absorption tower, which is made predominantly of nitrogen with no or negligible content of nitric acid.

According to a preferred embodiment, the operating pressure of said first bleacher is chosen in such a way that the nitrogen oxides-loaded stripping medium is directly recycled to the discharge-side of said compressor. The term "directly" denotes that said nitrogen oxides-loaded stripping medium is recycled thereto without passing through further compressors.

Preferably, the first bleacher operates substantially at said absorption pressure.

The plant according to the invention preferably comprises a compressor (also referred to as "first compressor") which provides said first bleacher with said first stripping medium (i.e. air or oxygen-enriched air) at a suitable pressure, preferably substantially at said absorption pressure.

According to a preferred embodiment, the plant also comprises a heat exchanger at the discharge-side of said first compressor to cool down said first stripping medium before its admission into the first bleacher.

According to an alternative embodiment, said first compressor is designed to provide the first bleacher with said first stripping medium at the required bleacher operating temperature, which ranges between 80 and 120° C. and is preferably around 110° C.

According to a preferred embodiment, the second bleacher operates at a lower pressure than the first bleacher. Accordingly, the first bleacher can be also referred to as high pressure (HP) bleacher and the second bleacher as low pressure (LP) bleacher.

Due to the higher pressure of the first bleacher than the second bleacher, the partially stripped nitric acid stream leaving the first bleacher partially flashes gas dissolved therein in a control valve before being admitted into the second LP bleacher. Preferably, the second LP bleacher operates substantially at the same pressure as the ammonia oxidation reaction.

The term "substantially" is used to denote that the first HP bleacher and the second LP bleacher operate, respectively, at the same nominal pressure of the absorption tower and of the ammonia oxidation reactor, namely at the absorption pressure and the ammonia oxidation reaction pressure apart from pressure losses.

Inside the second LP bleacher, nitrogen oxides are advantageously stripped with said first stripping medium thus providing a nitrogen oxides-loaded medium besides the above referred stream of bleached nitric acid. Preferably, said loaded medium is recycled at the suction-side of said nitrous gas compressor elevating the pressure of the gaseous effluent of the ammonia oxidation reactor to the absorption pressure.

According to a preferred embodiment, the plant of the invention also comprises a further compressor (also referred to as "second compressor") providing the second LP bleacher with said second stripping medium (i.e. air or oxygen-enriched air) at a suitable pressure, preferably at the nominal pressure of the ammonia oxidation reactor.

Preferably, the drive power for said second compressor and the drive power for the nitrous gas compressor come from a tail-gas turbine and a steam turbine or electric motor. Similarly, the drive power for the first compressor comes from the tail gas turbine and a steam turbine or electric motor.

Preferably, the oxidation of ammonia providing a gaseous stream containing nitrogen oxides is carried out in the presence of air or oxygen-enriched air.

Preferably, the second compressor also provides at least part of said air or oxygen-enriched air to the ammonia oxidation reactor. In greater detail, the air or oxygen-enriched air delivered by said second compressor splits into two portions: a first portion is used as oxygen source in the ammonia oxidation reactor, and a second portion is used as stripping medium in the second LP bleacher.

Preferably said second portion is cooled down in a heat exchanger before entering the second bleacher. Preferably, said heat exchanger is a tail gas or demineralized water pre-heater or a cooler using cooling water as heat exchange medium.

Another object of the present invention is a dual-pressure process for the production of nitric acid according to the annexed claims.

Still another aspect of the present invention is the revamping of an existing dual-pressure plant for the production of nitric acid according to the annexed claims. Said revamping comprises: installing at least a further bleacher, re-directing the nitric acid-containing effluent of the absorption tower to said further bleacher, providing a partially stripped nitric acid stream and a nitrogen oxides-loaded air stream; the former being directed to an existing bleacher and the latter being recycled at the discharge-side of the compressor of the effluent of the ammonia oxidation reactor.

According to a preferred embodiment, said nitrogen oxides-loaded air stream is recycled directly at the discharge-side of the compressor, i.e. without passing through further compressors. Preferably, the newly installed bleacher operates at the same nominal pressure of the absorption tower, which is greater than the pressure of the existing bleacher. Preferably, a compressor is installed to provide the new bleacher with a stripping medium (e.g. air or oxygen-enriched air) at said pressure.

The present invention has several advantages.

A first advantage is that bleaching of the nitric acid leaving the absorption tower is carried out in two stages, i.e. in two bleachers, resulting in better performances and production of nitric acid of higher purity.

A further advantage is an increase of the capacity of the nitric acid plant without modification of the compressor train, thanks to the fact that the nitrogen oxides-loaded air stream provided by the new bleacher advantageously has the same nominal pressure of the absorption tower, hence it is injected at the discharge-side of the nitrogen oxides compressor.

The invention will now be elucidated with reference to a non-limitative example of preferred embodiments.

DETAILED DESCRIPTION

Figure 1:
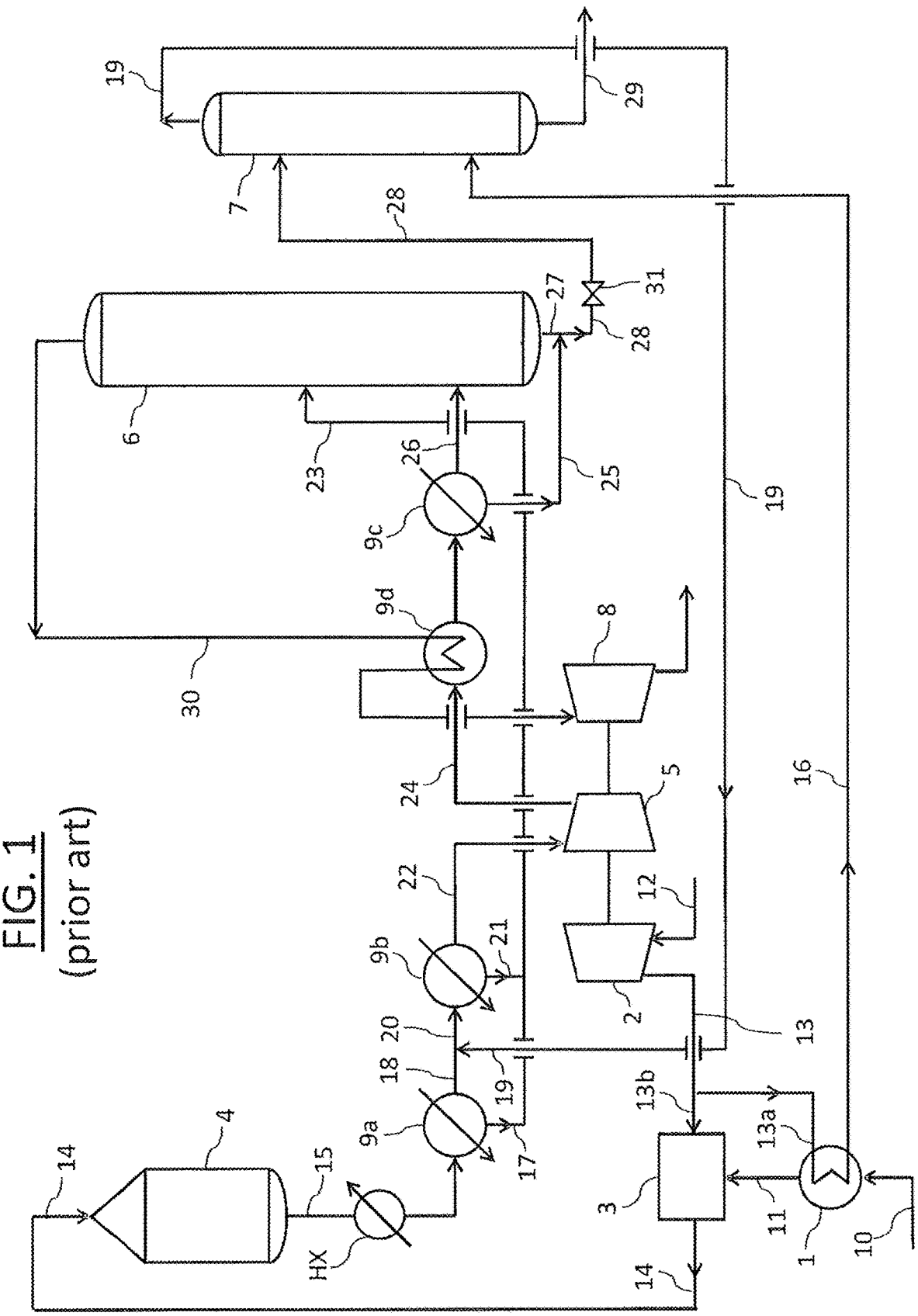
FIG. 1 shows a plant for the nitric acid production according to the prior art.

The plant shown in FIG. 1 essentially comprises an ammonia pre-heater 1, an air compressor 2, an air-ammonia mixer 3, a reactor 4 for the oxidation of ammonia, a nitrous gas compressor 5, an absorption tower 6, a bleacher 7, a tail-gas turbine 8, water cooler-condensers 9a-9c and a tail-gas pre-heater 9d.

An ammonia stream 10 is heated to a temperature of about 150° C. in an ammonia pre-heater 1, resulting in a hot ammonia stream 11.

An air flow 12 is compressed from atmospheric pressure to the reaction pressure, for example of around 2-6 bar, in the air compressor 2, resulting in a compressed air stream 13. Said stream 13 splits into a first portion 13a and a second portion 13b.

Said first portion 13a is sent to the ammonia pre-heater 1, where it is cooled down providing an air stream 16 used as stripping medium in the bleacher 7.

Said second portion 13b is mixed with ammonia 11 inside the mixer 3 to provide the input stream 14 of the reactor 4, wherein ammonia is catalytically oxidized at around 900° C. to provide a gaseous effluent 15 essentially containing nitrogen oxides and water.

The term of "nitrogen oxides" denotes the following: nitrogen monoxide (NO), nitrogen dioxide ($NO_2$), dinitrogen tetroxide ($N_2O_4$) and dinitrous monooxide ($N_2O$). For the sake of simplicity, nitrogen oxides are also referred to as $NO_x$.

The heat content of the gaseous effluent 15 is partially recovered in a series of heat exchangers HX upstream of the water cooler-condenser 9a.

The gaseous effluent 15 is then further cooled in said cooler-condenser 9a, wherein it reaches a temperature lower than 50° C. and the water contained in said effluent partially condenses, thus providing a nitric acid solution 17 and a $NO_x$-containing stream 18.

Said stream 18 is mixed with $NO_x$-loaded air 19 which is recycled from the bleacher 7 and the resulting mixture 20 is sent to a subsequent cooler-condenser 9b, which provides a nitric acid solution 21 and a $NO_x$-containing stream 22 with a water content lower than the stream 18.

Said nitric acid solution 21 mixes with the solution 17 obtained from the previous cooler-condenser 9a and the resulting mixture 23 is supplied to the absorption tower 6.

Said $NO_x$-containing stream 22 is compressed to an absorption pressure, for example of around 9-16 bar, in the nitrous gas compressor 5, obtaining a compressed $NO_x$-containing stream 24 at a temperature of around 130-160° C.

Said stream 24 passes through a tail-gas pre-heater 9d and then through a cooler-condenser 9c. Inside the cooler-condenser 9c, the stream 24 is cooled to a temperature of about 50° C., obtaining a nitric acid solution 25 and a $NO_x$-containing stream 26.

Said nitric acid solution 25 mixes with the stream of raw nitric acid 27 from the absorption tower 6, thus providing a stream 28.

Said $NO_x$-containing stream 26 enters the absorption tower 6, where it is contacted with water to provide the stream of raw nitric acid 27 also containing $NO_x$. Generally, said absorption tower 2 is a tray or packed column where $NO_x$ are absorbed in water to form nitric acid.

Said stream 27 leaves the absorption tower 6 and, upon mixing with the above referred nitric acid solution 25, is fed to the bleacher 7 as stream 28 after partial flashing in a valve 31. Said bleacher 7 substantially operates at the same pressure as the reactor 1, preferably at a pressure of 2-6 bar.

Inside said bleacher 7, $NO_x$ are stripped with the air stream 16 to provide a stream 29 of purified nitric acid and the above mentioned $NO_x$-loaded air stream 19. Said air stream 19 is recycled at the suction-side of the nitrous gas compressor 5, preferably it is mixed with the $NO_x$-containing stream 18 leaving the cooler-condenser 9a.

The absorption tower 6 also provides a tail gas 30 as overhead product, which is mostly composed of nitrogen and also contains oxygen and $NO_x$. Said tail gas 30 exits the absorption tower 6 at around 20° C. and is preheated in the tail-gas pre-heater 6d, before being expanded in the tail-gas turbine 8.

The turbine 8 supplies around 60-70% of the power required by the air compressor 2 and the nitrous gas compressor 5. The remaining power can be obtained from a steam turbine (not shown).

Figure 2:
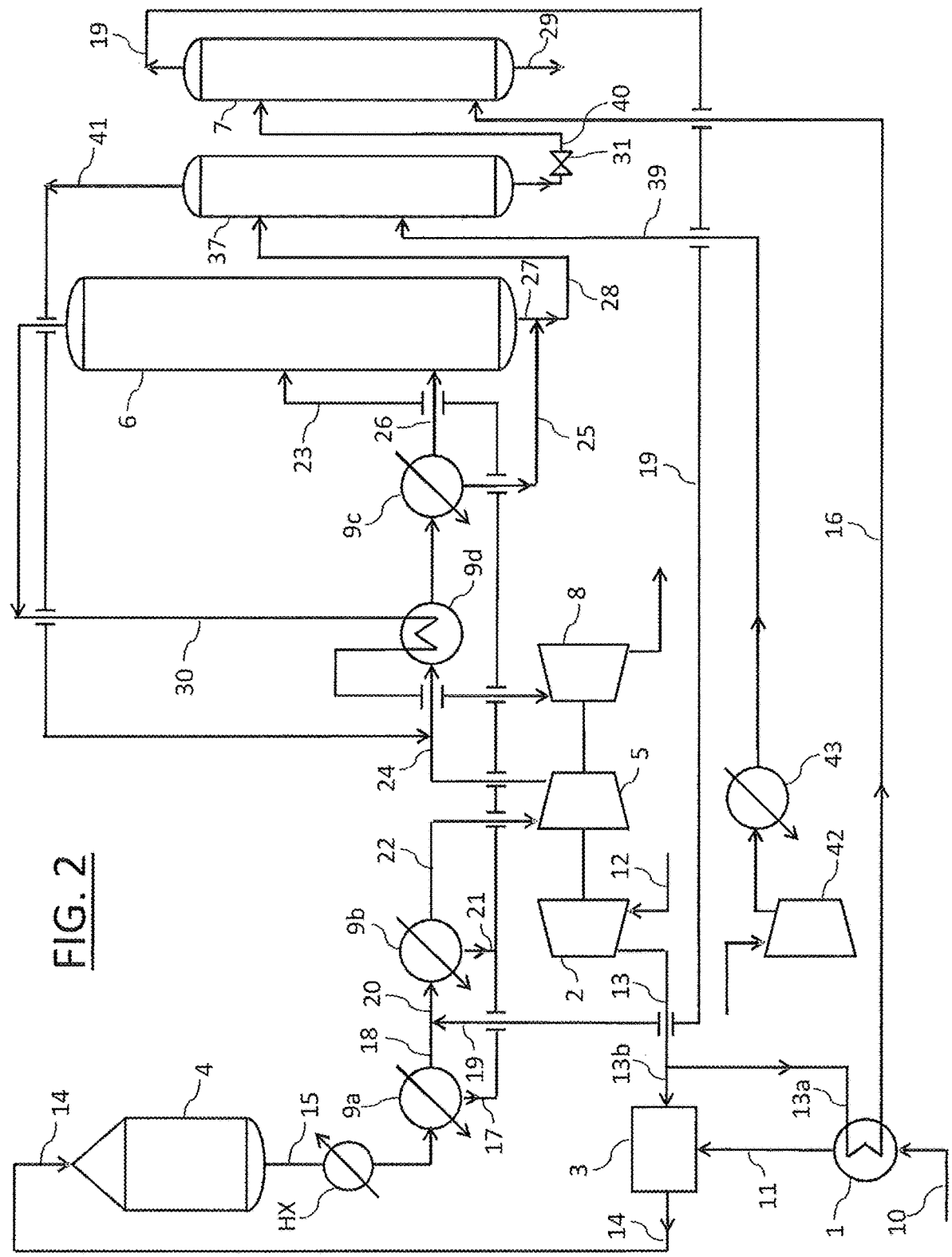
FIG. 2 shows the plant of FIG. 1 modified according to an embodiment of the present invention.

FIG. 2 shows the plant of FIG. 1 modified according to the invention.

A bleacher 37 operating substantially at the same pressure as the absorption tower 6, preferably at a pressure of 9-16 bar, is installed upstream of the bleacher 7.

For simplicity, the bleacher 37 and the bleacher 7 will be referred to as high-pressure (HP) bleacher and low-pressure (LP) bleacher, respectively.

The output stream of the absorption tower 6 is supplied via the line 28 to the HP bleacher 37, wherein $NO_x$ are stripped by means of air 39 to provide a partially stripped nitric acid stream 40 and a nitrogen oxides-loaded air stream 41.

Said partially stripped nitric acid stream 40 is sent to the LP bleacher 7, wherein nitrogen oxides are further stripped to provide said stream of purified nitric acid 29. Since the bleacher 37 operates at a greater pressure (e.g. 9-16 bar) than the bleacher 7 (e.g. 2-6 bar), the stripped nitric acid stream 40 is properly flashed in the valve 31 before entering the bleacher 7.

The nitrogen oxides-loaded air stream 41 is advantageously sent to the discharge-side of said nitrogen oxides compressor 5.

A further air compressor 42 is also provided, which supplies the HP bleacher 37 with stripping air 39 at a suitable pressure of e.g. 9-16 bar. A heat exchanger 43 is further provided at the discharge-side of said air compressor 42 to cool down the stripping air 39 before its admission into the HP bleacher 37. Said further air compressor 42 is advantageously smaller than the existing air compressor 2.

In the specific case where the plant of FIG. 2 is obtained by revamping the plant of FIG. 1, the line 28 feeding the raw nitric acid from the absorption tower 6 to the existing LP bleacher 7 is modified to accommodate the newly installed HP bleacher 37.

What is claimed is:

1. A method of revamping of a dual-pressure plant for the synthesis of nitric acid which comprises:
   installation of at least a further bleacher into the dual-pressure plant that comprises:
   a reactor;
   an absorption tower fed with a gaseous effluent containing nitrogen oxides coming from said reactor;
   a compressor; and
   a bleacher fed with an output product stream of the absorption tower;
   re-directing the output product stream from the absorption tower to said further bleacher;

directing a partially stripped nitric acid stream effluent from said further bleacher to the existing bleacher; and recycling a nitrogen oxides-loaded stripping medium effluent from said further bleacher to the discharge-side of said compressor.

2. The method according to claim 1, wherein said nitrogen oxides-loaded stripping medium is directly recycled to the discharge-side of said compressor.

3. The method according to claim 2, further comprising the installation of a compressor for said oxides-loaded stripping medium upstream of the newly installed bleacher.

4. The method according to claim 3, further comprising the installation of a heat exchanger at the delivery-side of said stripping medium compressor upstream of the newly installed bleacher.

5. The method according to claim 1, further comprising the installation of a valve fed with said partially stripped nitric acid stream arranged upstream of the existing bleacher.

* * * * *